United States Patent
Nakano et al.

(10) Patent No.: US 11,359,690 B2
(45) Date of Patent: Jun. 14, 2022

(54) SHOCK ABSORBER

(71) Applicant: KYB MOTORCYCLE SUSPENSION CO., LTD., Gifu (JP)

(72) Inventors: Takaaki Nakano, Gifu (JP); Yuta Matsubara, Gifu (JP)

(73) Assignee: KYB MOTORCYCLE SUSPENSION CO., LTD., Gifu (JP)

( * ) Notice: Subject to any disclaimer, the term of this patent is extended or adjusted under 35 U.S.C. 154(b) by 162 days.

(21) Appl. No.: 16/759,571

(22) PCT Filed: Jan. 31, 2019

(86) PCT No.: PCT/JP2019/003308
§ 371 (c)(1),
(2) Date: Apr. 27, 2020

(87) PCT Pub. No.: WO2019/155973
PCT Pub. Date: Aug. 15, 2019

(65) Prior Publication Data
US 2020/0340547 A1    Oct. 29, 2020

(30) Foreign Application Priority Data
Feb. 6, 2018 (JP) .............................. JP2018-018747

(51) Int. Cl.
| F16F 13/00 | (2006.01) |
| B62K 25/08 | (2006.01) |
| B60G 15/06 | (2006.01) |

(52) U.S. Cl.
CPC ............ F16F 13/007 (2013.01); B62K 25/08 (2013.01); B60G 15/062 (2013.01)

(58) Field of Classification Search
CPC ...... F16F 13/007; F16F 9/366; B60G 15/061; B60G 15/062; B62K 25/08; B62K 2025/048
See application file for complete search history.

(56) References Cited

U.S. PATENT DOCUMENTS

| 9,327,797 B2 * | 5/2016 | Kamioka ............... B62K 25/08 |
| 2014/0252706 A1 * | 9/2014 | Kamioka ............. B60G 15/061 |
| | | 267/217 |

FOREIGN PATENT DOCUMENTS

| JP | S57-070536 U | 4/1982 |
| JP | 2008-298138 A | 12/2008 |

(Continued)

OTHER PUBLICATIONS

Oct. 12, 2021, Japanese Office Action issued for related JP application No. 2018-018747.

(Continued)

*Primary Examiner* — Nishal R Sahni
(74) *Attorney, Agent, or Firm* — Paratus Law Group, PLLC

(57) ABSTRACT

A shock absorber includes: a collar which is mounted on an outer circumference of a cylinder movable in the axial direction with respect to an inner tube in which a liquid is stored and supports one end of a suspension spring. The collar has: an annular mounting portion whose one end is supported by the cylinder; an annular sliding contact portion provided to be closer to the suspension spring than the mounting portion and in sliding contact with an inner circumference of the inner tube; a truncated cone-shaped body portion that connects the mounting portion and the sliding contact portion and has a hole formed to apply a resistance against a flow of a liquid moving inside and outside the collar; and a rib formed on an inner circumference of the body portion along the axial direction.

4 Claims, 6 Drawing Sheets

(56) References Cited

FOREIGN PATENT DOCUMENTS

| | | | |
|---|---|---|---|
| JP | 2010-261477 A | 11/2010 | |
| JP | 2014-240664 A | 12/2014 | |
| JP | 2015-197153 A | 11/2015 | |
| WO | WO-2011077768 A1 * | 6/2011 | ........... B60G 15/062 |

OTHER PUBLICATIONS

Mar. 22, 2021, Austrian Office Action issued for related AT application No. 1A A 9003/2019.

* cited by examiner (a)

(b)

(a)

(b)

SHOCK ABSORBER

CROSS REFERENCE TO PRIOR APPLICATION

This application is a National Stage Patent Application of PCT International Patent Application No. PCT/JP2019/003308 (filed on Jan. 31, 2019) under 35 U.S.C. § 371, which claims priority to Japanese Patent Application No. 2018-018747 (filed on Feb. 6, 2018), which are all hereby incorporated by reference in their entirety.

TECHNICAL FIELD

The present invention relates to an improvement in a shock absorber.

BACKGROUND ART

Conventionally, shock absorbers interposed between a vehicle body and an axle in a vehicle include one that includes a telescopic tube member having a vehicle-body-side tube and an axle-side tube and houses a shock absorber main body exerting a main damping force and a suspension spring elastically supporting a vehicle body in the tube member.

Further, such shock absorbers include a shock absorber in which a collar, which is in sliding contact with an inner circumference of an axle-side tube, is mounted on an outer circumference of a cylinder of a shock absorber main body connected to a vehicle-body-side tube to support one end of a suspension spring by the collar and a hole is formed in the collar to apply resistance against a flow of a liquid, for example, as disclosed in JP 2010-261477 A.

According to the above configuration, a main damping force is generated by the shock absorber main body when the shock absorber expands and contracts, the liquid moves up and down the collar through the hole with soaking of the collar into the liquid stored in the axle-side tube as a boundary, and a secondary damping force is generated due to the resistance applied when the liquid passes through the hole.

SUMMARY OF INVENTION

As illustrated in FIG. 5, a conventional collar 400 has: a small-diameter annular mounting portion 500 supported by a cylinder 200; a large-diameter annular sliding contact portion 700 that is sliding contact with an inner circumference of an axle-side tube 100; and a truncated cone-shaped body portion 600 connecting the mounting portion 500 and the sliding contact portion 700, and a hole 900 configured to generate a secondary damping force is formed in the body portion 600.

In addition, in FIG. 5(a), a spring receiver 710 on which an upper end of a suspension spring 300 elastically supporting a vehicle body abuts is provided at a lower end of the sliding contact portion 700. Further, when the collar 400 is pushed up by an elastic force of the suspension spring 300 so that an upper end of the mounting portion 500 hits a stop ring 201 provided on an outer circumference of the cylinder 200, the collar 400 does not move in the axial direction and is fixed to the outer circumference of the cylinder 200.

In other words, a load is applied to the collar 400 in the axial direction in an attached state. In order to secure strength capable of withstanding the load, a plurality of vertical ribs 800 along the axial direction is formed on an outer circumference of the body portion 600, and an annular rib 810 erected along an edge of the hole 900 is formed (FIG. 5(b)).

Further, in the collar 400, a load generated by the suspension spring 300 is applied to a position (point E) shifted from a fulcrum P supported by the cylinder 200 to the outer circumferential side, and the load received by the sliding contact portion 700 from the suspension spring 300 is transmitted to the cylinder 200 via the vertical rib 800. As described above, since the vertical rib 800 is located on the outer circumference of the body portion 600, the load applied to the sliding contact portion 700 is transmitted on the outer circumferential side of a straight line L connecting the point E and the fulcrum P where the load is received.

Then, when a moment to widen the body portion 600 is generated so that the collar 400 is deformed by the action of the moment at the start of a stroke of the shock absorber, the collar 400 behaves as a part of the suspension spring 300, and the elastic force of the suspension spring 300 in the initial stroke is substantially reduced, and it is difficult to obtain a linear spring characteristic (a broken line a in FIG. 6). In addition, the generation of the above moment is disadvantageous in terms of strength, and thus, the annular rib 810 is required to secure the strength of the collar 400, and the collar 400 becomes heavy.

Therefore, an object of the present invention is to provide a shock absorber that can solve such a problem, obtain a linear spring characteristic, and reduce a weight of a collar.

A shock absorber of the present invention includes: an annular mounting portion in which a collar mounted on an outer circumference of a shaft movable in the axial direction with respect to a tube and supporting one end of a spring has one end supported by the shaft; an annular sliding contact portion provided to be closer to the spring side than the mounting portion and in sliding contact with an inner circumference of the tube; a truncated cone-shaped body portion that connects the mounting portion and the sliding contact portion and that has a hole to provide a resistance against a flow of a liquid moving inside and outside the collar; and a rib formed on an inner circumference of the body portion along the axial direction.

DESCRIPTION OF EMBODIMENTS

Hereinafter, a shock absorber according to an embodiment of the present invention will be described with reference to the drawings. The same reference sign throughout the several drawings indicate the same part.

Figure 1:
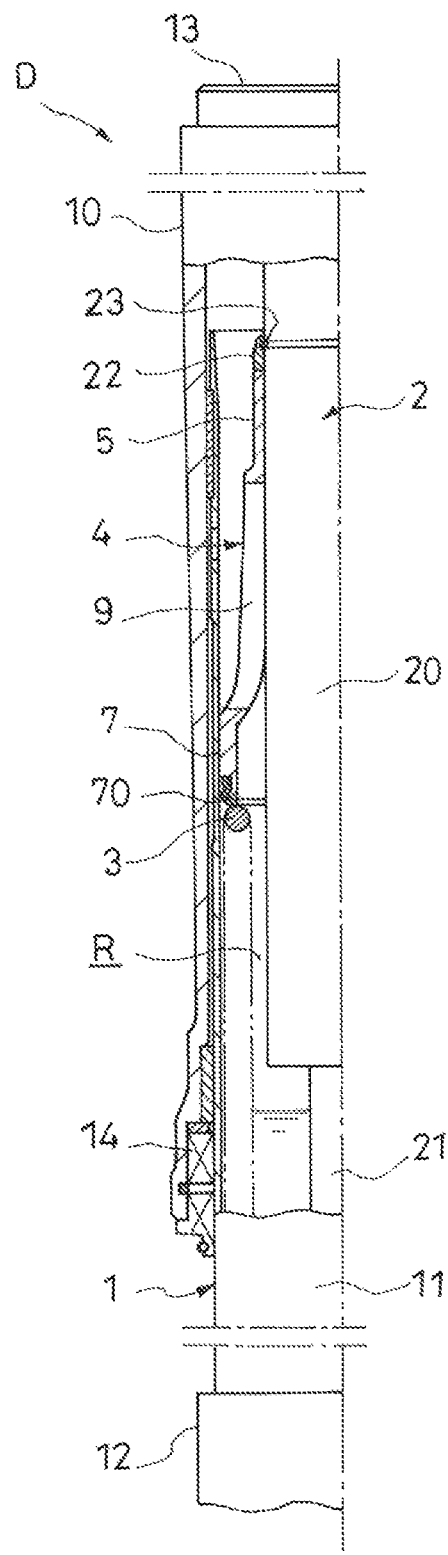
FIG. 1 is a partially cutaway front view of a shock absorber according to one embodiment of the present invention.

A shock absorber D according to one embodiment of the present invention illustrated in FIG. 1 is used for a front fork suspending front wheels of a saddle-riding type vehicle. The upper and lower sides of the shock absorber D in a state where the front fork is mounted on a vehicle, that is, in the attached state are simply referred to as "up" and "down" the shock absorber D unless otherwise specified.

The shock absorber D includes: a telescopic tube member 1 having an outer tube 10 and an inner tube 11 slidably inserted into the outer tube 10; a shock absorber main body 2 housed in the tube member 1; and a suspension spring 3.

In the present embodiment, the tube member 1 is of an inverted type, and is arranged with the outer tube 10 facing upward (a vehicle body side) and the inner tube 11 facing downward (an axle side). That is, the outer tube 10 is a vehicle-body-side tube, and the inner tube 11 is an axle-side tube, in the present embodiment.

Further, the outer tube 10 is connected to a vehicle body of the vehicle via a vehicle-side bracket (not illustrated), and the inner tube 11 is connected to an axle of the front wheels via an axle-side bracket 12. In this manner, the shock absorber D is interposed between the vehicle body and the axle, and the inner tube 11 moves in and out of the outer tube 10 so that the shock absorber expands and contracts when the front wheels vibrate up and down as the vehicle travels on an uneven road.

Note that the tube member 1 is of an upright type, and the outer tube 10 may be an axle-side tube and the inner tube 11 may be a body-side tube. In addition, the application of the shock absorber D is not limited to the front fork, and may be used for a rear cushion unit that suspends rear wheels of a saddle-riding type vehicle, a suspension of an automobile, or the like.

Subsequently, an upper end of the outer tube 10 is closed by a cap 13. In addition, a lower end of the inner tube 11 is closed by the axle-side bracket 12. Further, a gap between overlapping portions of the outer tube 10 and the inner tube 11 is closed by a sealing member 14. In this manner, the tube member 1 is sealed, and the shock absorber main body 2 and the suspension spring 3 are housed inside the tube member 1.

In addition, a liquid storage chamber R is provided between the tube member 1 and the shock absorber main body 2, in which hydraulic oil is stored and a gas is sealed above the liquid level.

The shock absorber main body 2 includes a cylinder 20 that stores hydraulic oil, and a rod 21 that is inserted into the cylinder 20 so as to be movable in the axial direction, and applies a resistance against a flow of the hydraulic oil generated when the cylinder 20 and the rod 21 relatively move in the axial direction to generate a main damping force.

In addition, the shock absorber main body 2 is of an inverted type, and the rod 21 protruding outside the cylinder 20 is arranged to face downward (the axle side) in the present embodiment. Further, the cylinder 20 is connected to the outer tube 10 via the cap 13, and the rod 21 is connected to the inner tube 11 via the axle-side bracket 12. In this manner, the shock absorber main body 2 is interposed between the outer tube 10 and the inner tube 11, and the cylinder 20 and the rod 21 relatively move in the axial direction when the shock absorber D expands and contracts, thereby generating the main damping force.

Note that the shock absorber main body 2 may be of an upright type, and be arranged such that the rod 21 protruding outside the cylinder 20 faces upward (the vehicle body side), and the rod may be connected to the vehicle-body-side tube. In addition, the liquid used for the shock absorber main body 2 is not limited to the hydraulic oil, but may be a liquid other than the hydraulic oil, such as water and an aqueous solution, or a gas. In addition, the liquid stored in the liquid storage chamber R is not limited to the hydraulic oil, but may be a liquid other than the hydraulic oil such as water and an aqueous solution.

Subsequently, the suspension spring 3 is a coil spring. Further, an upper end of the suspension spring 3 is supported by the collar 4 mounted on the outer circumference of the cylinder 20, and a lower end of the suspension spring 3 is supported by the axle-side bracket 12. Since the axle-side bracket 12 is connected to the inner tube 11, it can be said that the suspension spring 3 is interposed between the cylinder 20 and the inner tube 11.

Further, when the shock absorber D that is being expanded starts the stroke so that the cylinder 20 enters the inner tube 11, the suspension spring 3 is compressed and elastically deformed to exert an elastic force corresponding to the amount of the deformation. Then, the cylinder 20 is biased by the suspension spring 3 in a direction to retract from the inner tube 11. That is, the shock absorber D is biased in the expansion direction by the suspension spring 3. Further, the suspension spring 3 elastically supports the vehicle body in the shock absorber D according to the present embodiment.

Note that the spring supported by the collar 4 may be a spring other than the suspension spring 3. In addition, the inner tube 11 is the tube that stores the hydraulic oil (liquid), and the cylinder 20 is a shaft which moves in the axial direction with respect to the tube and has the outer circumference on which the collar 4 is mounted. However, when the tube member 1 is an inverted type, the outer tube 10 may be the tube. In addition, when the shock absorber main body 2 is of an upright type, the collar 4 may be mounted on the outer circumference of the rod 21 using the rod 21 as the shaft.

Figure 2:
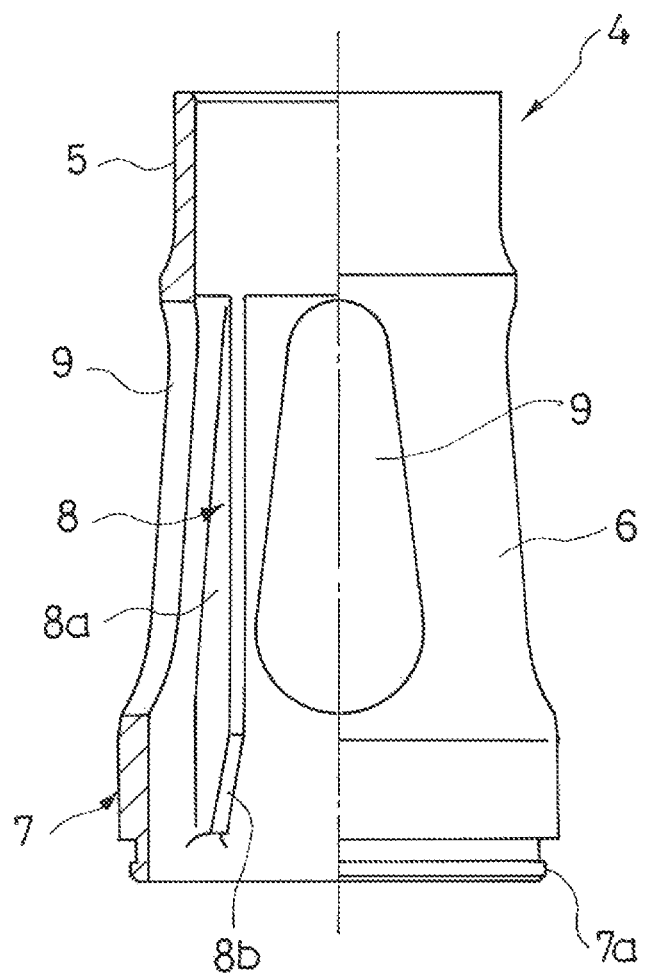
FIG. 2 is a partially cutaway front view of a collar of the shock absorber according to the embodiment of the present invention.

Subsequently, as illustrated in FIG. 2, the collar 4 has: an annular mounting portion 5 located on an upper portion of the collar 4, a truncated cone-shaped cylindrical body portion 6 that is continuous with a lower end of the mounting portion 5 and gradually expands in diameter as proceeding downward; and an annular sliding contact portion 7 which is continuous with a lower end of the body portion 6 and has an inner diameter and an outer diameter each of which is larger than that of the mounting portion 5. In this manner, the collar 4 has the truncated conical cylindrical shape having large and small annular portions at the top and bottom as a whole. In addition, a rib 8 is formed on the inner circumference of the collar 4 along the axial direction, and a hole 9 penetrating through the thickness of the body portion 6 is formed.

Further, as illustrated in FIG. 1, the collar 4 is arranged with the sliding contact portion 7 facing the suspension spring 3 side, and the sliding contact portion 7 supports the upper end of the suspension spring 3. Specifically, the collar 4 of the present embodiment is made of a synthetic resin, and a metal spring receiver 70 is fitted to a fitting portion 7a (FIG. 2) provided at the lower end of the sliding contact portion 7, and the upper end of the suspension spring 3 abuts on the spring receiver 70. In this manner, the collar 4 is made of the synthetic resin, and thus, is lightweight in the present embodiment.

Note that a method of integrating the collar 4 and the spring receiver 70 is not limited to the fitting, but may be insert-molding or the like. In addition, materials of the collar 4 and the spring receiver 70 can be changed respectively. Further, the fitting portion 7a and the spring receiver 70 may be omitted, and the suspension spring 3 may directly hit the lower end of the sliding contact portion 7 depending on the material of the collar 4.

In addition, a stopper 22 is provided on the outer circumference of the cylinder 20 located on the opposite side of the suspension spring 3 with the collar 4 interposed therebetween so as to protrude radially outward from the cylinder 20. Further, when the suspension spring 3 abuts on the spring receiver 70, the collar 4 is pushed up by the elastic force of the suspension spring 3, the upper end of the mounting portion 5 hits the stopper 22, and the collar 4 does not move in the axial direction with respect to the cylinder 20. In this manner, the collar 4 is attached to the outer circumference of the cylinder 20 in the state of being positioned by the stopper 22.

In the present embodiment, the stopper 22 is annular, and is caulked and fixed to an outer circumference of a snap ring 23 mounted on the outer circumference of the cylinder 20. However, such a structure can be changed as appropriate if the upper end of the mounting portion 5 is supported by the cylinder 20. For example, the stopper 22 may be formed integrally with the cylinder 20, and the stopper 22 may be a plurality of protrusions provided on the outer circumference of the cylinder 20 side by side in a circumferential direction.

As described above, the mounting portion 5 abuts on the outer circumference of the cylinder 20 with the inner circumference by the cylinder 20 in the state where the collar 4 is attached to the outer circumference of the cylinder 20. In addition, the outer diameter of the mounting portion 5 is smaller than the inner diameter of the inner tube 11, and a gap is formed on the outer circumferential side of the mounting portion 5. In addition, the sliding contact portion 7 comes into sliding contact with the inner circumference of the inner tube 11 with the outer circumference slidably supported by the inner tube 11 in the state where the collar 4 is attached to the outer circumference of the cylinder 20. In addition, the inner diameter of the sliding contact portion 7 is larger than the outer diameter of the cylinder 20, and a gap is formed on the inner circumferential side of the sliding contact portion 7.

Further, the shape of the body portion 6 is the truncated conical cylindrical shape in which the inner and outer diameters of the sliding contact portion 7 are larger than the inner and outer diameters of the mounting portion 5. Therefore, a gap is formed on the outer circumferential side of the body portion 6, and a radial width of the gap increases toward the mounting portion 5. On the other hand, a gap can be also formed on the inner circumferential side of the body portion 6, and a radial width of the gap increases toward the sliding contact portion 7.

As described above, the rib 8 is formed on the inner circumference of the collar 4 along the axial direction, and the rib 8 passes through the inner circumferential side of the body portion 6 as will be described later in detail. Further, the gap formed on the inner circumferential side of the body portion 6 is partitioned by the rib 8. On the other hand, since there is no rib on the outer circumference of the collar 4, the gap formed on the outer circumference of the body portion 6 is cylindrical.

Figure 3:
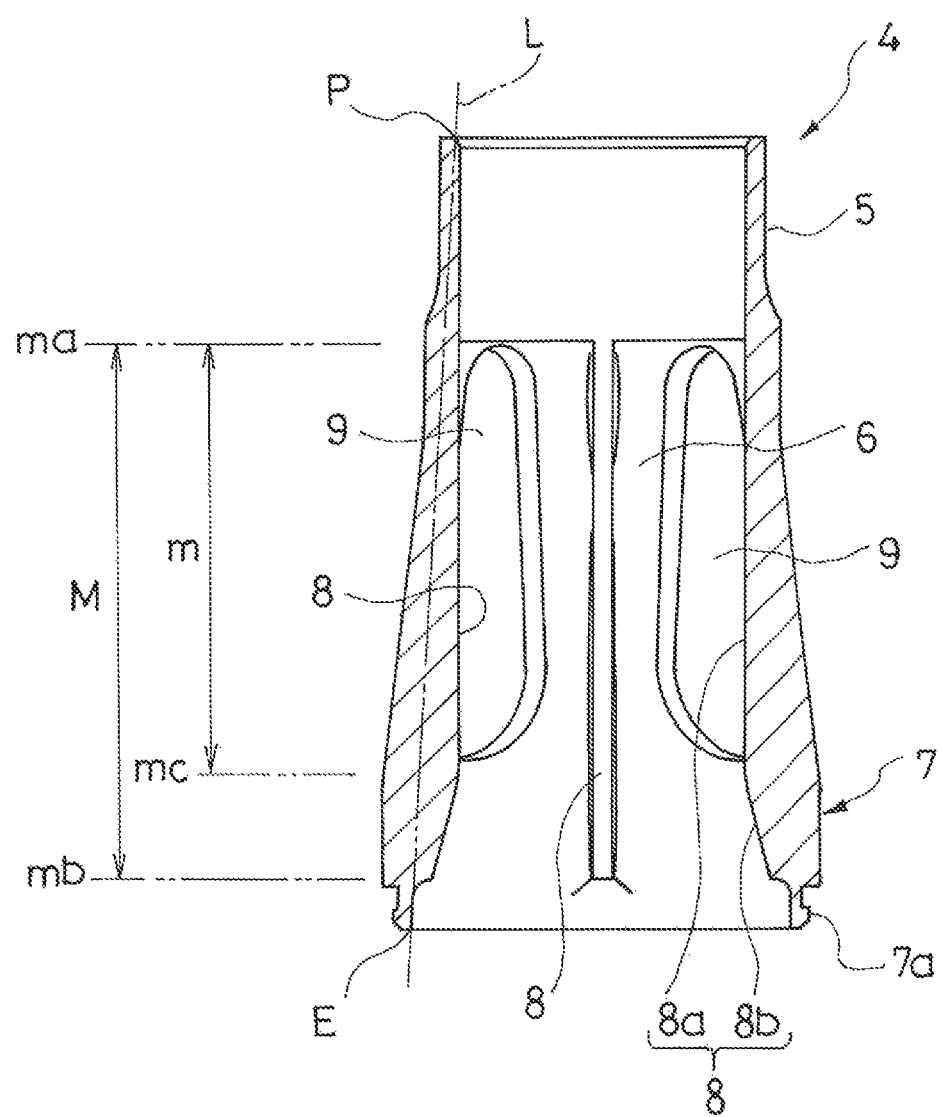
FIG. 3 is a cross-sectional view of a collar of the shock absorber according to the embodiment of the present invention cut along line XX in FIG. 4(a).

As illustrated in FIGS. 2 and 3, the rib 8 of the present embodiment is formed in a straight line along the axial direction of the collar 4, and is formed continuously from the lower end of the mounting portion 5 to the vicinity of the lower end of the sliding contact portion 7 through the body portion 6. That is, the rib 8 is formed on the entire inner circumference of the body portion 6 in the axial direction and has the lower end extending up to the inner circumference of the sliding contact portion 7 in the present embodiment.

In this manner, the rib 8 is provided on the inner circumference of the body portion 6 in the present embodiment. Therefore, even if the collar 4 receives a load from the suspension spring 3 at a position shifted to the outer circumferential side from a fulcrum P (FIG. 3) supported by the cylinder 20, the rib 8 is arranged on a straight line L connecting a point E where the load is received and the fulcrum P. Accordingly, when the load is transmitted from the sliding contact portion 7 to the cylinder 20 via the rib 8, the load is transmitted near the straight line L, and thus, the load is transmitted efficiently, and the deformation of the collar 4 can be suppressed.

More specifically, when a vertical rib 800 is provided on an outer circumference of a body portion 600 as in the related art, a load is transmitted on the outer circumferential side of the straight line L, and thus, a moment to widen the body portion 600 is generated. On the other hand, when the rib 8 is provided on the inner circumference of the body portion 6 as in the present embodiment, the load is transmitted more linearly as compared with the related art, the efficiency is high and the generation of the moment can be suppressed.

Figure 5:
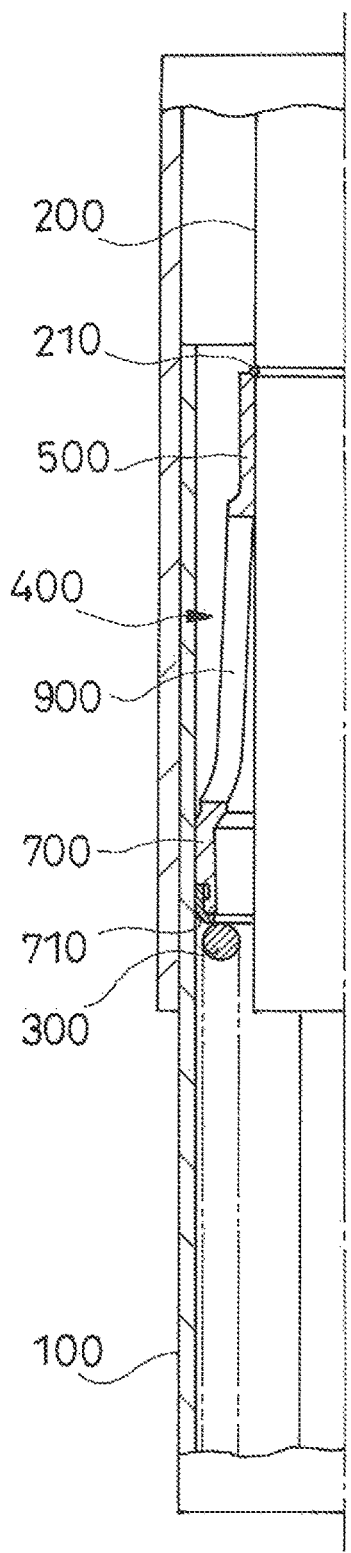
FIG. 5(a) is a partially cutaway front view of a conventional shock absorber.
FIG. 5(b) is a partially cutaway front view of a collar of the conventional shock absorber.
Figure 5:
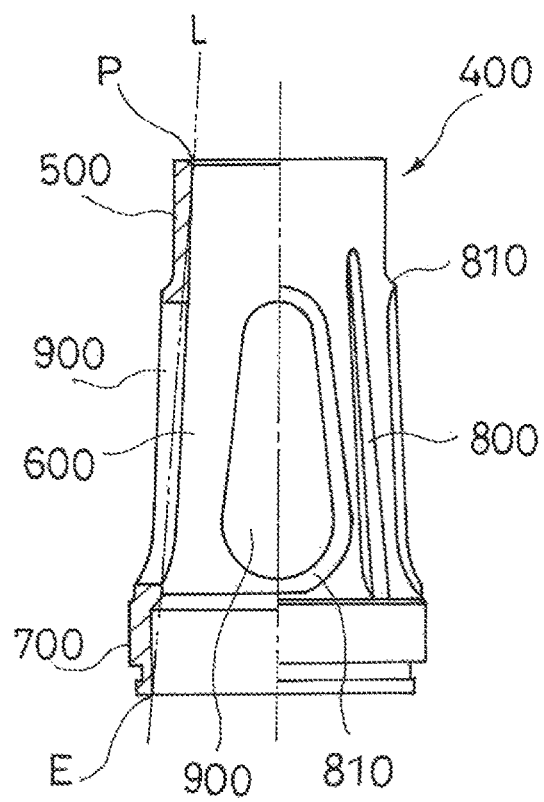
Figure 6:
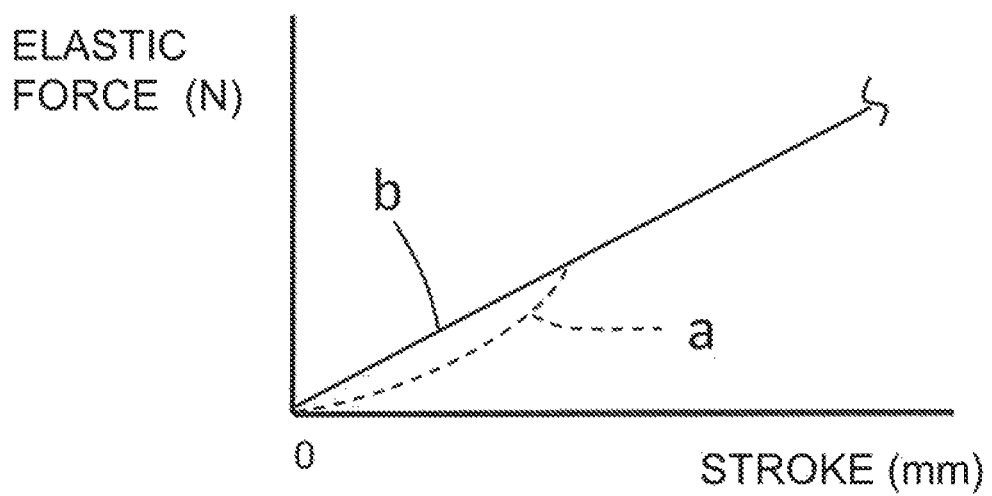
FIG. 6 is a characteristic diagram illustrating a spring characteristic at the start of a stroke of the shock absorber.

Therefore, the deformation of the collar 4 due to the action of the moment can be suppressed, and thus, the deformation of the collar 4 at the start of the stroke of the shock absorber D can be suppressed, and a more linear spring characteristic of the shock absorber D can be obtained. In other words, the spring characteristic can be approximated to the linear characteristic illustrated by a solid line b in FIG. 6. Further, since the suppression of the generation of the moment is advantageous in terms of strength, and thus, it is unnecessary to provide an annular rib (for example, an annular rib 810 in FIG. 5(*b*)) in order to secure the strength of the collar 4, and the collar 4 can be reduced in weight.

Figure 4:
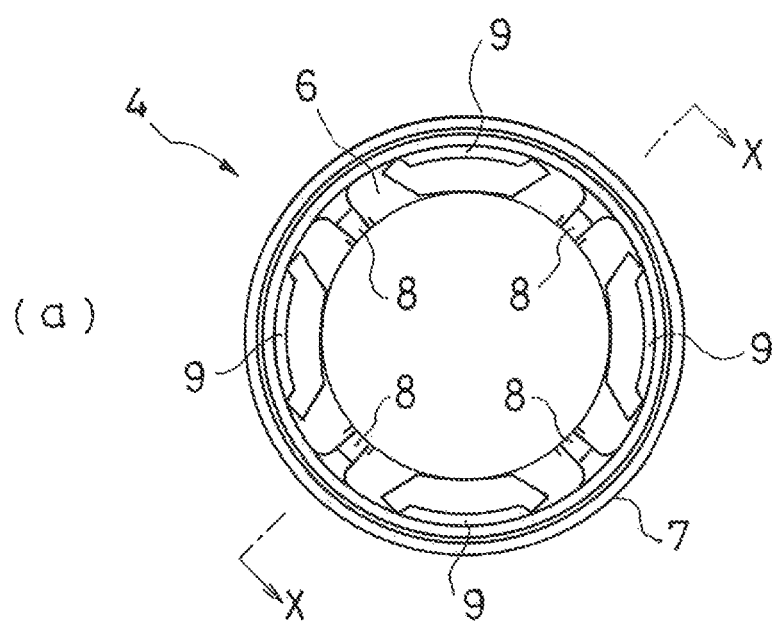
FIG. 4(a) is a bottom view of the collar of the shock absorber according to the embodiment of the present invention.
FIG. 4(b) is an explanatory view illustrating a shape of a gap formed between a body portion of the collar and a cylinder in an attached state.
Figure 4:
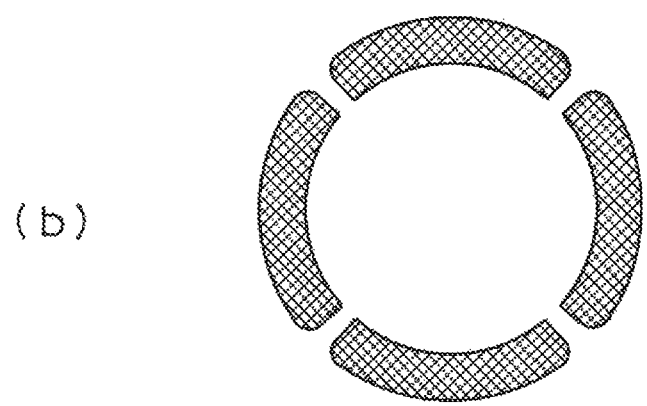

In addition, the four ribs 8 of the present embodiment are provided at equal intervals in the circumferential direction of the collar 4 as illustrated in FIG. 4. Further, each of these four ribs 8, 8, 8, and 8 protrudes toward the center of the collar 4. Further, each of the holes 9 formed in the body portion 6 is arranged between the adjacent ribs 8 and 8. That is, the four holes 9 and the four ribs 8 are provided in the present embodiment, and these are alternately arranged in the circumferential direction. However, the number and the intervals of the holes 9 and the ribs 8 are not limited to these and can be changed as appropriate.

In addition, assuming that a center end of the collar 4 in each of the ribs 8 is a distal end, the distal end of the rib 8 located on the body portion 6 abuts on the outer circumference of the cylinder 20. On the other hand, the distal end of the rib 8 located on the sliding contact portion 7 is inclined to be separated from the cylinder 20 toward the lower end (FIGS. 2 and 3). Hereinafter, a portion of the rib 8 in contact with the outer circumference of the cylinder 20 is referred to as a partition portion 8a, and a portion where the distal end is inclined is referred to as a guide portion 8b.

As described above, the guide portion 8b is provided at the lower end of the rib 8, and thus, the collar 4 can be easily mounted on the outer circumference of the cylinder 20 in the present embodiment. Further, the guide portion 8b is formed on the sliding contact portion 7. As illustrated in FIG. 3, even if the distal end of the rib 8 of the sliding contact portion 7 is inclined and separated from the cylinder 20, the rib 8 does not deviate from the straight line L connecting the point E where the load from the suspension spring 3 is received and the fulcrum P, there is no disadvantage in terms of strength.

In addition, the partition portion 8a is formed in the body portion 6, and the distal end of the rib 8 in the body portion 6 approaches the cylinder 20 in the present embodiment. Therefore, the deformation of the collar 4 can be suppressed even by the cylinder 20, which is more advantageous in terms of strength. Further, the gap between the body portion 6 and the cylinder 20 is partitioned by the partition portion 8a. As described above, the four ribs 8 are provided side by side in the circumferential direction of the body portion 6 (FIG. 4(a)). Therefore, four gaps partitioned by the ribs 8 are formed between the body portion 6 and the cylinder 20. The shape of these gaps is illustrated in FIG. 4(b).

Further, the four holes 9 are formed in the body portion 6 and are arranged one by one between the adjacent ribs 8 and 8. Therefore, the hydraulic oil flowing into the inside of the collar 4 from the sliding contact portion 7 side is guided to the hole 9 by the rib 8 and flows from the hole 9 to the outside of the collar 4 without interruption. That is, since the partition portion 8a is provided on the inner circumference of the body portion 6 in the present embodiment, the flow of the liquid from the inside to the outside of the collar 4 through the hole 9 can be rectified.

Note that there may be some gap between the rib 8 and the cylinder 20 in order to function as a rectifying partition. Further, in order to obtain the rectifying effect, it is sufficient that the collar 4 is formed such that the hole 9 falls within the axial range M (FIG. 3) where the rib 8 is formed, and ranges in which the rib 8, the partition portion 8a, and the guide portion 8b are provided can be changed according to the required strength or the like. However, in order to more reliably obtain the rectifying effect, it is preferable to form the collar 4 such that the hole 9 falls within the axial range m (FIG. 3) where the partition portion 8a having the distal end approaching the outer circumference of the cylinder 20 is formed.

Here, the state where the distal end of the partition portion 8a approaches the outer circumference of the cylinder 20 includes a state where the distal end of the partition portion 8a abuts on the outer circumference of the cylinder 20, and a state where there is a slight gap between the partition portion 8a and the outer circumference of the cylinder 20. The slight gap is sufficient as long as the hydraulic oil does not easily pass through the gap.

In addition, the range within the axial range M (m) of the collar 4 where the rib 8 (partition portion 8a) is formed indicates a range interposed between a straight line ma which is perpendicular to the axis of the collar 4 and passes through the upper end of the rib 8 (partition portion 8a) and a straight line mb (mc) which is perpendicular to the axis of the collar 4 and passes through the lower end of the rib 8 (partition portion 8a) in a view from the radial direction (when the collar 4 is viewed from the side).

Further, the state where the hole 9 is provided in the axial range M (m) of the collar 4 where the rib 8 (partition portion 8a) is formed indicates a state where the upper end of the hole 9 is at a position which is the same as or lower than the straight line ma and the lower end of the hole 9 is at a position which is the same as or higher than the straight line mb (mc), and the hole 9 does not deviate vertically from the range M (m).

Subsequently, the hole 9 is formed vertically long along the axial direction of the body portion 6 and has a narrower width toward the upper end, and the shape of the hole 9 is a teardrop shape with a rounded distal end in the present embodiment. Further, the hole 9 is formed to apply the resistance against the flow of the hydraulic oil passing through the hole 9.

Note that the shape of the hole 9 is not limited to the one illustrated in the drawing, and can be changed as appropriate. In addition, when the plurality of holes 9 is provided in the collar 4 as in the present embodiment, sizes and shapes of the holes 9 are not necessarily the same.

According to the above configuration, when the collar 4 moves up and down in the hydraulic oil during the expansion and contraction of the shock absorber D where the cylinder 20 and the inner tube 11 relatively move in the axial direction, the hydraulic oil moves up and down the collar 4 through the hole 9. Further, the hole 9 applies the resistance against the flow of the hydraulic oil moving up and down the collar 4. Therefore, when the collar 4 is at the position immersed in the hydraulic oil during the expansion and contraction of the shock absorber D, the main damping force is generated by the shock absorber main body 2, and a secondary damping force is generated due to the resistance applied when the hydraulic oil passes through the hole 9.

On the other hand, when the collar 4 moves above the liquid level of the hydraulic oil during the expansion and contraction of the shock absorber D where the cylinder 20 and the inner tube 11 relatively move in the axial direction, the gas passes through the hole 9 without any resistance. Therefore, when the collar 4 is located above the liquid level of the hydraulic oil during the expansion and contraction of the shock absorber D, no secondary damping force is generated, and thus, the damping force generated by the shock absorber D is only the main damping force generated by the shock absorber main body 2.

Hereinafter, an operation and an effect of the shock absorber D according to the present embodiment will be described.

The shock absorber D according to the present embodiment includes: the inner tube (tube) 11 in which the hydraulic oil (liquid) is stored; the cylinder (shaft) 20 movable in the axial direction with respect to the inner tube 11; and the collar 4 mounted on the outer circumference of the cylinder 20 and supporting one end of the suspension spring (spring) 3.

Further, in the present embodiment, the collar 4 has: the annular mounting portion 5 whose upper end (one end) is supported by the cylinder (shaft) 20; the annular sliding contact portion 7 provided to be closer to the suspension spring 3 side (spring side) than the mounting portion 5 and in sliding contact with the inner circumference of the inner tube (tube) 11; the truncated cone-shaped body portion 6 that connects the mounting portion 5 and the sliding contact portion 7 and has the hole 9 formed to apply the resistance against the flow of the liquid moving inside and outside the collar 4; and the rib 8 formed on the inner circumference of the body portion 6 along the axial direction.

In this manner, the rib 8 is provided on the inner circumference of the body portion 6 of the collar 4 in the present embodiment. Therefore, even if the collar 4 receives the load from the suspension spring 3 at the position shifted to the outer circumferential side from the fulcrum P supported by the cylinder 20, the rib 8 can be arranged on the straight line L connecting the point E where the load is received and the fulcrum P. Accordingly, when the load from the suspension spring 3 is transmitted from the sliding contact portion 7 to the cylinder 20 via the rib 8, the load is transmitted near the straight line L as compared with the related art, the load is efficiently transmitted to suppress the generation of the moment to widen the body portion 6, and the deformation of the collar 4 can be suppressed.

Further, the deformation of the collar 4 due to the action of the moment can be suppressed, and thus, the deformation of the collar 4 at the start of the stroke of the shock absorber D can be suppressed, and the more linear spring characteristic (the solid line b in FIG. 6) of the shock absorber D can be obtained. Further, the suppression of the generation of the moment is advantageous in terms of strength. Therefore, there is no need to provide the annular rib 810 as in the collar 400 of the related art, and the collar 4 can be reduced in weight.

In addition, in the present embodiment, a plurality of ribs 8 is formed in the circumferential direction of a collar 4, and each of holes 9 is formed between the adjacent ribs 8 and 8. Further, the hole 9 is formed in the collar 4 in an axial range M where the rib 8 is formed. Therefore, when the shock absorber D contracts, the flow of the hydraulic oil (liquid) flowing into each of the holes 9 from the sliding contact portion 7 side of the collar 4 can be rectified by the rib 8, and thus, the secondary damping force during the contraction stabilizes. Further, the ribs 8 and 8 are arranged on both sides in the circumferential direction of the hole 9 according to the above configuration, and thus, the strength of the collar 4 can be easily secured. However, the number and arrangement of the ribs 8 and the holes 9 are not limited to those illustrated in the drawings, and can be changed as appropriate.

In addition, the rib 8 of the present embodiment is in contact with the outer circumference of the cylinder (shaft) 20. Therefore, the deformation of the collar 4 can also be suppressed by the cylinder 20, which is advantageous in terms of strength. However, there may be a gap between the rib 8 and the cylinder (shaft) 20. Further, such a change can be made without being limited to the number and arrangement of the holes 9 and the ribs 8.

Although the preferred embodiment of the present invention has been described above in detail, modifications, variations and changes are possible without departing from the scope of the claims.

The invention claimed is:

1. A shock absorber comprising:
a tube in which a liquid is stored;
a shaft movable in an axial direction with respect to the tube; and
a collar that is mounted on an outer circumference of the shaft and supports one end of a spring,
wherein the collar includes an annular mounting portion whose one end is supported by the shaft, an annular sliding contact portion provided to be closer to the spring than the mounting portion and in sliding contact with an inner circumference of the tube, a truncated cone-shaped body portion that connects the mounting portion and the sliding contact portion and has holes formed to apply a resistance against a flow of the liquid moving inside and outside the collar, and a rib formed on an inner circumference of the body portion along the axial direction, and
the rib is arranged on a straight line connecting a fulcrum supported by the shaft and a point receiving a load from the spring in the collar.

2. The shock absorber according to claim 1, wherein
a plurality of the ribs is formed side by side in a circumferential direction of the collar, and each of the holes is formed between the adjacent ribs.

3. The shock absorber according to claim 1, wherein
the holes are formed in the collar in an axial range where the rib is formed.

4. The shock absorber according to claim 1, wherein
the rib is in contact with the outer circumference of the shaft.

* * * * *